United States Patent [19]

Lu

[11] Patent Number: 4,813,445
[45] Date of Patent: Mar. 21, 1989

[54] APPARATUS FOR SUPPLYING FUEL UNDER NEGATIVE GRAVITY CONDITIONS

[75] Inventor: Chang-shi Lu, Strongsville, Ohio

[73] Assignee: Parker-Hannifin Corporation, Cleveland, Ohio

[21] Appl. No.: 58,014

[22] Filed: Jun. 4, 1987

[51] Int. Cl.⁴ ............................................. F16K 17/36
[52] U.S. Cl. ....................................... 137/38; 137/264; 244/135 R
[58] Field of Search .............. 137/38, 264; 244/135 R

[56] References Cited

U.S. PATENT DOCUMENTS

| | | | |
|---|---|---|---|
| 1,845,136 | 2/1932 | Dieter | 137/38 X |
| 2,660,384 | 11/1953 | Smith . | |
| 2,933,095 | 4/1960 | Rumsey | 137/38 |
| 2,953,156 | 9/1960 | Bryant | 137/264 |
| 3,443,778 | 5/1969 | Sanz . | |
| 4,203,458 | 5/1980 | Barrett et al. . | |

Primary Examiner—Robert G. Nilson
Attorney, Agent, or Firm—Ralph E. Jocke

[57] ABSTRACT

Apparatus for supplying liquid from a tank (12) to an inlet of a pump (40) without interruption when the condition of the tank changes to a reversed gravity condition, includes a hollow, standpipe body (20) having a first inlet opening (26) and a second inlet opening (28). Internal walls divide the standpipe into a first compartment (32) in communication with the tank through first opening (26), a second compartment (36) which is in communication with a pump inlet port (38) connected to the inlet of pump (40), and a third compartment (42) which is in communication with the tank through second inlet opening (28). Third compartment (42) is also in communication with the discharge of pump (40) through a bleed line (46). The first and second, and second and third compartments are in fluid connection through holes (48) and (50) respectively, in the dividing walls. A vertically moveable spool (52) includes a weighted upper disc (56) and a weighted lower disc (54). The spool includes a connecting stem (58) of sufficient length so that when one disc is adjacent its associated hole blocking fluid flow therethrough, the other disc is disposed from its associated hole enabling fluid flow. In a first gravity condition the stem is disposed downward and fluid flows through first inlet opening (26), first hole (50), second compartment (20), inlet port (38) and into a pump inlet (39). In the first gravity condition, third compartment (42) fills with fluid to the height of second inlet opening (28). Upon gravity reversal, spool (52) moves to open hole (50) and close hole (48) making the accumulated fluid in third compartment (42) immediately available for flow into second compartment (36) and the pump.

32 Claims, 8 Drawing Sheets

APPARATUS FOR SUPPLYING FUEL UNDER NEGATIVE GRAVITY CONDITIONS

BACKGROUND OF THE INVENTION

1. Technical Field

This invention relates to systems for supplying fuel to the engines of aircraft. Specifically, the invention relates to systems for supplying fuel to aircraft under negative gravity conditions.

2. Background Art

Gravity normally pulls liquid fuel toward the bottom of a tank. For this reason, the fuel systems of surface vehicles such as ships, locomotives and automobiles normally draw fuel from near the lowest point in the fuel tank to fully utilize all available fuel.

Aircraft fuel supply systems present problems not present in surface vehicles. Aircraft may experience negative gravity conditions during high-speed maneuvering and when they fly upside-down. Under negative gravity conditions, liquid fuel moves to the "top" of a fuel cell. If a fuel cell is partially empty, an inlet near what is normally the bottom of the cell loses connection with the fuel. This results in loss of fuel flow to the engines, loss of power and, if the condition continues for sufficient time, engine shutoff. Negative gravity conditions of short duration particularly cause problems when air enters the fuel pump and causes it to lose its prime. Some pumps encounter difficulty resuming flow once fuel is again available at the inlet. Air entrapped in a fuel system can also cause cavitation, vibration and uneven fuel flow to the engine which may result in poor performance ad damage to system components.

Several systems have been previously developed to maintain the supply of fuel to aircraft engines under negative gravity conditions. Examples of such systems are found in U.S. Pat. Nos. 2,660,384, 3,443,778 and 4,203,458. Each of these prior systems draws fuel from what is usually considered the uppermost part of the fuel cell when the aircraft experiences a negative gravity condition. A problem exhibited by these and all other prior systems of which Applicant is aware, is that such systems may pass a large slug of air through the fuel system when they change over from the normal positive gravity condition to a negative gravity condition and vice versa.

A further problem with prior systems is that they add substantially to the weight and cost of an aircraft. For example, there are substantial weight and cost penalties associated with the use of dual impeller pumps such as that utilized in U.S. Pat. No. 2,660,384. The internal baffles in the fuel cells required for operation of the device shown in U.S. Pat. No. 4,203,458 likewise adds weight and cost. Other systems such as those shown in U.S. Pat. No. 3,443,778 employ small valves and flow passages which may become clogged due to dirt in the fuel, and pressure diaphragms which wear and eventually break.

Thus, there exists a need for an apparatus for supplying fuel to an aircraft fuel system under negative gravity conditions which reduces the amount of air that enters the system when the aircraft reverses its gravity condition. Further, there exists a need for an apparatus for supplying fuel to an aircraft fuel system under negative gravity conditions which is lower in weight, less expensive to implement, and more reliable than existing systems.

DISCLOSURE OF INVENTION

It is an object of the present invention to provide a fuel supply apparatus for supplying fuel from a tank to a fuel system of an aircraft which minimizes the amount of air entering the system under reversing gravity conditions.

It is a further object of the present invention to provide a fuel supply apparatus for supplying fuel from a tank to a fuel system of an aircraft under reversing gravity conditions that is lower in weight than prior apparatus.

It is a further object of the present invention to provide a fuel supply apparatus for supplying fuel from a tank to a fuel system of an aircraft under reversing gravity conditions that is less expensive to implement that prior apparatus.

It is a further object of the present invention to provide a fuel supply apparatus for supplying fuel from a tank to a fuel supply system of an aircraft under reversing gravity conditions that is more reliable than prior apparatus.

Further objects of the present invention will be made apparent in the following best modes for carrying out the invention and the appended claims.

The foregoing objects are accomplished by an apparatus for drawing fuel from an aircraft fuel tank. The apparatus includes a hollow elongated body or standpipe located within the tank. The standpipe has at least one first fluid inlet opening adjacent what is a lower portion of the tank when the aircraft is in the usual first gravity condition. The standpipe also has at least one second fluid inlet opening adjacent an upper portion of the tank.

Internal walls within the standpipe serve as dividing means and divide the standpipe into three compartments. A first wall located adjacent the first inlet opening divides a first compartment and a second compartment. The first compartment is defined by the first wall and a lower portion of the standpipe, and is open to the tank through the first inlet opening.

A second wall is located in the standpipe upwardly disposed from the first wall. The first wall and the second wall define the second compartment within the standpipe. The second compartment is in fluid communication with an inlet of a fuel pump. The fuel pump also incorporates a discharge outlet which supplies fuel at high pressure to the engines of the aircraft.

A third compartment is defined by an upper portion of the standpipe and the second wall. The third compartment is open to the interior of the tank through the second fluid opening. A bleed line from the discharge of the pump feeds fluid at a low flow rate into the third compartment through a bleed port.

The first wall separating the first and second compartments incorporates a first circular hole for passing fluid between the compartments. The second wall also incorporates a similar hole for passing fluid between the second and third compartments. The holes are similarly sized circular openings, are located vertically above each other and are coaxial.

A spool inside the standpipe incorporates a lower weighted disc and an upper weighted disc which are connected by a stem. The stem is mounted for vertical movement along the axis of said first and second holes. The upper disc is located in the third compartment adjacent the second wall. The lower disc is located in the first compartment adjacent the first wall. The stem is of sufficient length so that when the upper disc is in contact with the second wall, the lower disc is disposed away from the first wall and vice versa. The discs incorporate gaskets at their peripheries to prevent fluid flow around the disc when it is in contact with the wall. The stem is sized such that fluid may flow through the holes around the stem when the disc is disposed away from the wall.

In the first gravity condition the lower disc is pulled downward. This causes the lower disc to be disposed from the first hole. The second disc is therefore caused to contact the second wall and close the second hole. In this condition, fluid is drawn from the bottom of the tank along a path through the first inlet opening, into the first compartment, through the first hole and into the second compartment. From there the fluid passes into the inlet of the pump. In this condition, the bleed line from the discharge side of the pump fills the third compartment with fluid through the bleed port until fluid flows back into the tank through the second inlet opening at the top of the standpipe.

When the tank experiences a negative gravity condition, the weighted mass of the discs causes the spool to move so the lower disc seals the first hole, stopping fluid flow between the first and second compartments. The upper disc translates away from the second hole as the first hole is closed, causing fluid to be drawn from the third compartment into the second compartment. Fluid is drawn into the second inlet opening near the top of the tank where fluid is located in the negative gravity condition. The accumulation of fluid in the third compartment prior to onset of the negative gravity condition makes fluid available as soon as the second hole is opened. Thus, there is no induction of air into the fuel pump.

When the system reverts to the first gravity condition from the reversed gravity condition, the second hole is closed and the first hole is again opened. Fluid is again drawn from the bottom of the tank and provided to the inlet side of the pump through the first and second compartments.

BEST MODES FOR CARRYING OUT INVENTION

Figure 1:
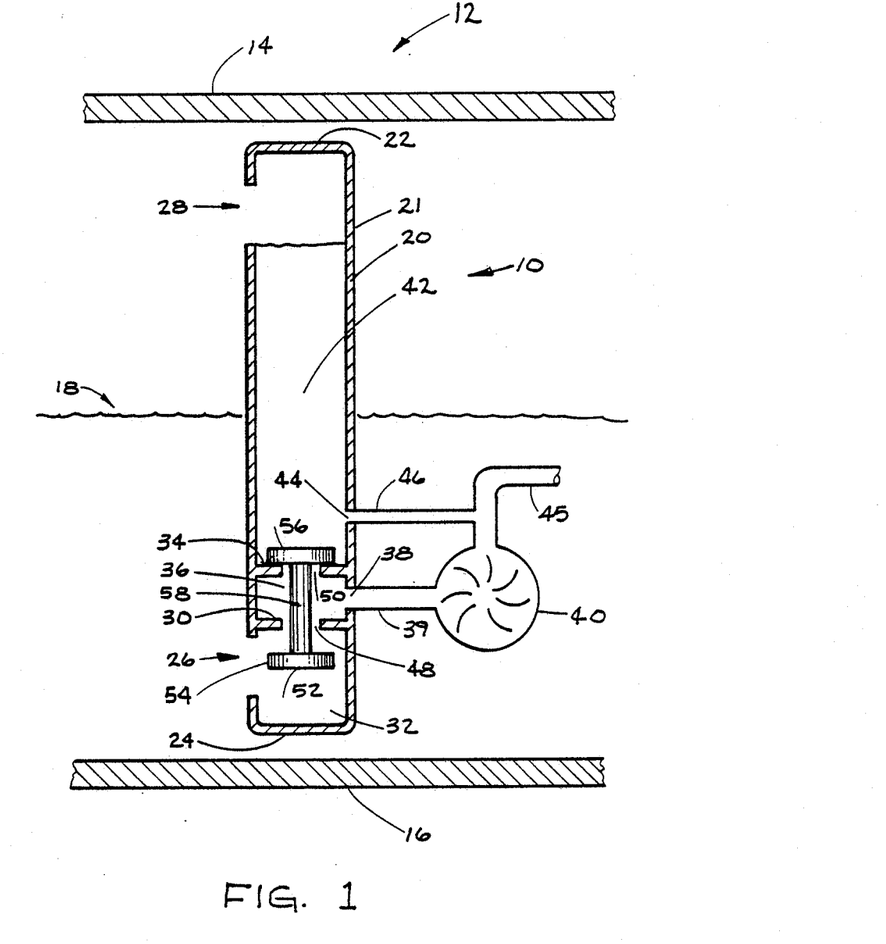
FIG. 1 is a sectional view of a first simplified embodiment of the apparatus of the present invention in a first gravity condition.

Referring now to the drawings and particularly to FIG. 1, there is shown therein a first simplified embodiment of the present invention generally indicated 10. The invention is located inside an aircraft fuel tank generally indicated 12, having an upper wall 14 and a lower wall 16. The fuel is confined in between the upper and lower walls. For purposes of this description "upper" and "lower" are used with respect to a frame of reference for a first gravity condition of the aircraft shown in FIG. 1, wherein the aircraft is not accelerating in any direction and wherein liquid fuel located in the tank is pulled by gravitational force toward lower wall 16. It is understood that although certain items are referred to for the sake of understanding as "upper" or "lower" or their relative positions are specified as "above" or "below" or with similar words, their positions with respect to the earth may be otherwise when the aircraft is inverted. For the first gravity condition shown in FIG. 1 an upper surface 18 of the fuel in fuel tank 12 is located as shown.

The invention includes a hollow elongated cylindrical body or standpipe 20 in tank 12. Standpipe 20 is bounded by a cylindrical side wall 21 and is closed at the upper end by a cap portion 22 and at the lower end by a cap portion 24. Standpipe 20 incorporates a first fluid inlet opening 26 adjacent lower wall 16 and a second fluid inlet opening 28 adjacent upper wall 14. Fluid is free to pass into and out of standpipe 20 through fluid inlet openings 26 and 28. In certain embodiments it is desirable to cover fluid inlet openings 26 and 28 with a porous screen to prevent dirt and other impurities from entering the aircraft fuel system.

A first traverse wall 30 serves as dividing means and is positioned in the standpipe adjacent first inlet 26. First wall 30 and lower internal portion of the standpipe 20 define a first compartment 32 inside the standpipe.

A second traverse wall 34 also serves as dividing means and is vertically disposed in standpipe 20 from first wall 30. First wall 30 and second wall 34 define a second compartment 36 inside the standpipe. A pump inlet opening 38 extends through side wall 21 in second compartment 36. Inlet opening 38 is connected by fluid connecting means to a low pressure pump inlet 39 of a pump 40 shown schematically in FIG. 1. Pump 40 also has a high pressure discharge 45 from which fuel at high pressure is supplied to the remainder of the fuel system. Pump 40 is a conventional aircraft fuel pump such as a centrifugal pump.

Second wall 34 and an upper internal portion of standpipe 20 define a third compartment 42. Third compartment 42 is open to tank 12 through second inlet opening 28. A bleed port 44 extends through side wall 21 in third compartment 42. Bleed port 44 is connected to pump discharge 45 by bleed line 46 which serves as fluid connecting means.

First wall 30 incorporates a first circular hole 48. First hole 48 serves as first fluid passage means for passing fluid between the first and second compartments. Second wall 34 incorporates a second circular hole 50. Second hole 50 serves as second fluid passage means for passing fluid between the third and second compartments. First and second holes 48 and 50 respectively are similarly sized and vertically disposed coaxially.

A spool 52 extends between first compartment 32 and third compartment 42. Spool 52 includes a lower weighted disc 54 in first compartment 32 and an upper weighted disc 56 in third compartment 42. Disks 54 and 56 are interconnected by a stem. Stem 58 extends through holes 48 and 50 and is mounted on the standpipe for movement vertically along the line of the centers of said holes by guide means (not shown). Stem 58 is sized smaller than holes 48 and 50 so sufficient fluid may pass therein between to supply the pump and the engines of the aircraft.

Stem 58 is longer than the distance between first wall 30 and second wall 34. Thus, when upper disc 56 is in contact with second wall 34, lower disc 54 is disposed away from first wall 30. In this condition, fluid is blocked by upper disc 56 from passing through hole 50, but fluid is enabled to pass through hole 48. Likewise, when lower disc 54 is in contact with first wall 30, flow through hole 48 is blocked while flow through hole 50 is enabled. Preferably, discs 54 and 56 incorporate gasket means (not shown) on the faces adjacent dividing walls 30 and 34 for preventing flow around the discs when they are in contact with the wall. Thus, lower disc 54 serves as first valve means for opening and closing hole 48 and upper disc 56 serves as second valve means for opening and closing hole 50.

In the first gravity condition shown in FIG. 1, gravitational force acting on the mass of discs 54 and 56 pulls spool 52 downward. This causes disc 54 to be disposed away from first wall 30 opening a fluid passageway through hole 48. In this condition, hole 50 is blocked by disc 56. Fluid is drawn from the lower portion of the tank through first inlet opening 26 into first compartment 32. Fluid then passes from first compartment 32 to second compartment 36 through hole 48. Thereafter fuel is drawn by pump 40 from second compartment 36 into pump inlet opening 38.

Fluid passes out of the pump at high pressure through discharge 45. A small portion of the high pressure fluid is bled from discharge 45 by bleed line 46 and passed through bleed port 44 into third compartment 42. Bleed port 44 is sized to pass dirt and other matter without clogging. Third compartment 42 fills with fluid to the height of second inlet opening 28 as shown in FIG. 1. Further fluid supplied to third compartment 42 through bleed port 44 flows out of the standpipe through second inlet opening 28. The force of the fluid column in third compartment 42 presses against upper disc 56 tending to further hold it closed in the first gravity condition. The fluid in third compartment 42 also prevents air from entering the pump inlet in the event there is some leakage past disc 56.

Figure 2:
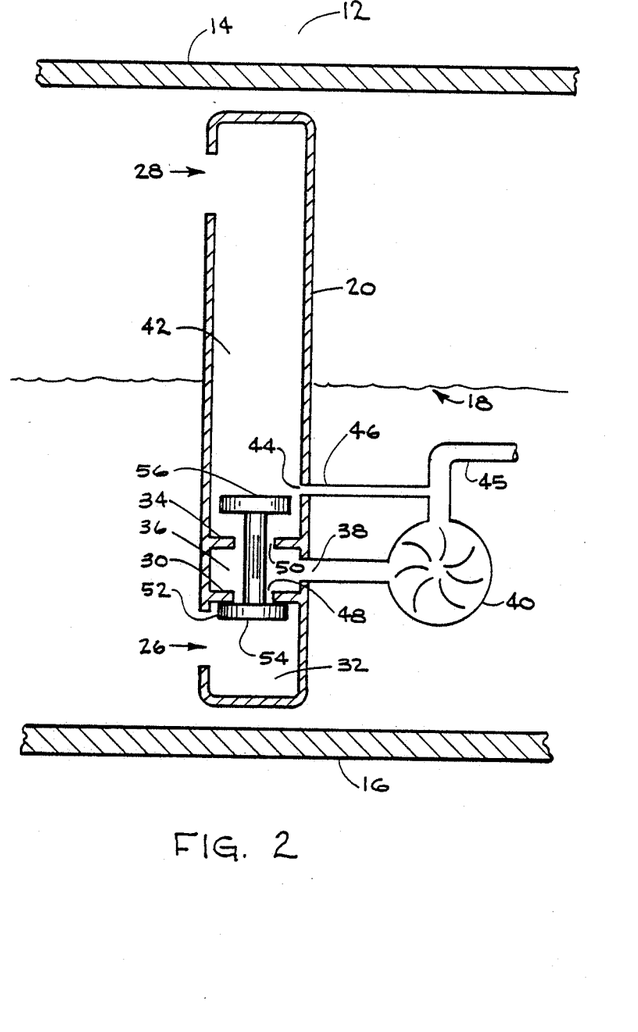
FIG. 2 is a sectional view of the first simplified embodiment of the invention in a reversed gravity condition.

FIG. 2 shows the apparatus of FIG. 1 in a negative, reversed gravity condition. A negative gravity condition such as that depicted in FIG. 2 can result from the aircraft flying upside down or from a rapid change in vertical acceleration such as during a power dive. In the negative gravity condition, the fluid is pulled by gravity or inertial force toward upper wall 14 of the tank. In the negative gravity condition the force acting on the mass of discs 54 and 56 pulls spool 52 upward as shown in FIG. 2. This causes disc 56 to be disposed away from second wall 34 opening hole 30 and allowing fluid to pass from third compartment 42 into second compartment 36. Disc 54 is concurrently pulled against first wall 30 closing hole 48. In the negative gravity condition fluid is drawn through second inlet opening 28 into third compartment 42 then through hole 50 into second compartment 36 and finally into pump inlet opening 38.

As the first embodiment passes from the first gravity condition shown in FIG. 1 to the negative gravity condition of FIG. 2, the amount of air which is drawn into the pump is minimal. This is because third compartment 42 of standpipe 20 is filled with fluid as the gravity condition changes. Thus, fluid is immediately available to supply the pump as soon as disc 56 opens hole 50.

Figure 10:
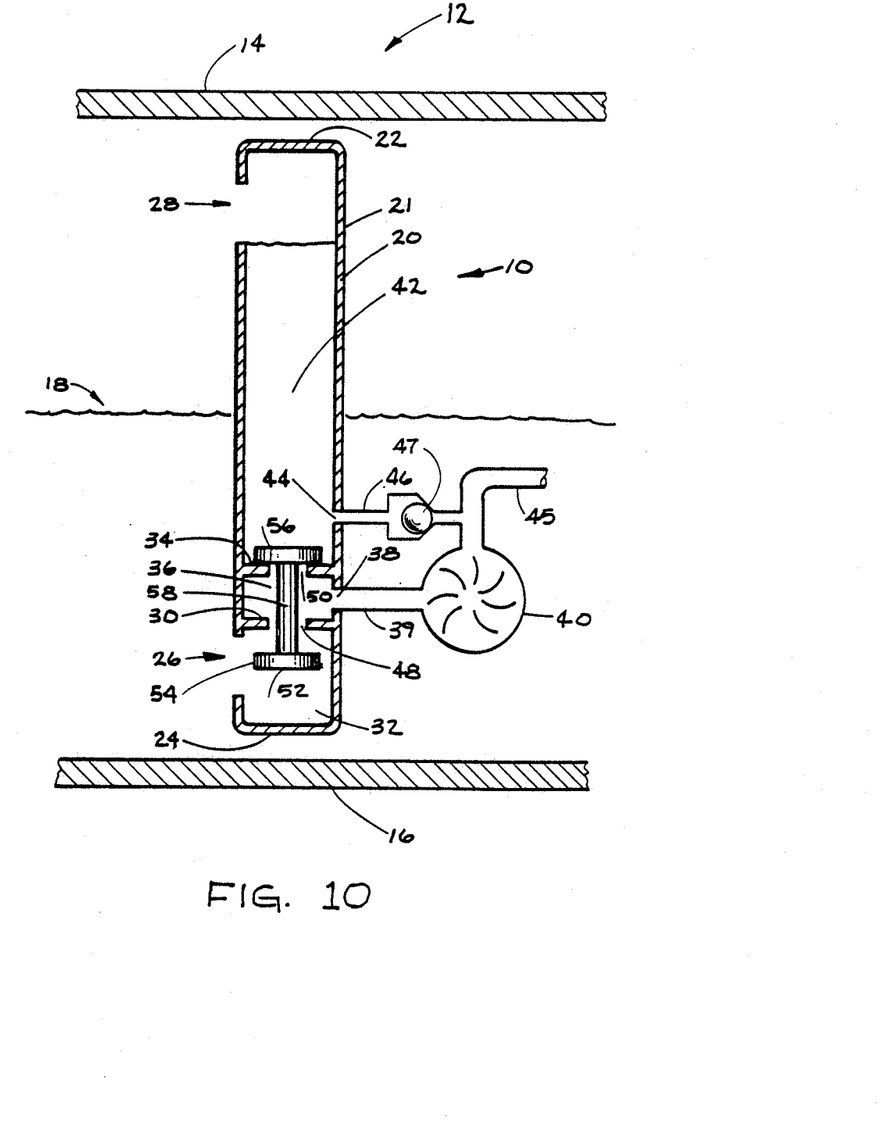
FIG. 10 is a sectional view of the first simplified embodiment shown in FIG. 1 with a one way fluid flow device in the pump outlet bleed line.

In certain aircraft fuel systems it is necessary to draw fuel from tank 12 by application of suction to discharge 45 without operating pump 40. If this is done and the apparatus is in the first gravity condition shown in FIG. 1, it is possible to draw air into discharge 45. This may occur when the fluid level 18 is below the level of second inlet opening 28. The application of suction to discharge 45 causes the fluid in third compartment 42 to be withdrawn to the level of bleed port 44. When air reaches the level of bleed port 44, air is induced into the system. As shown in FIG. 10, this undesirable condition can be prevented by placing a check valve 47 or other one-way flow device in bleed line 46 so fluid is enabled to flow only from discharge 45 to bleed port 44 and not in the opposite direction.

Figure 3:
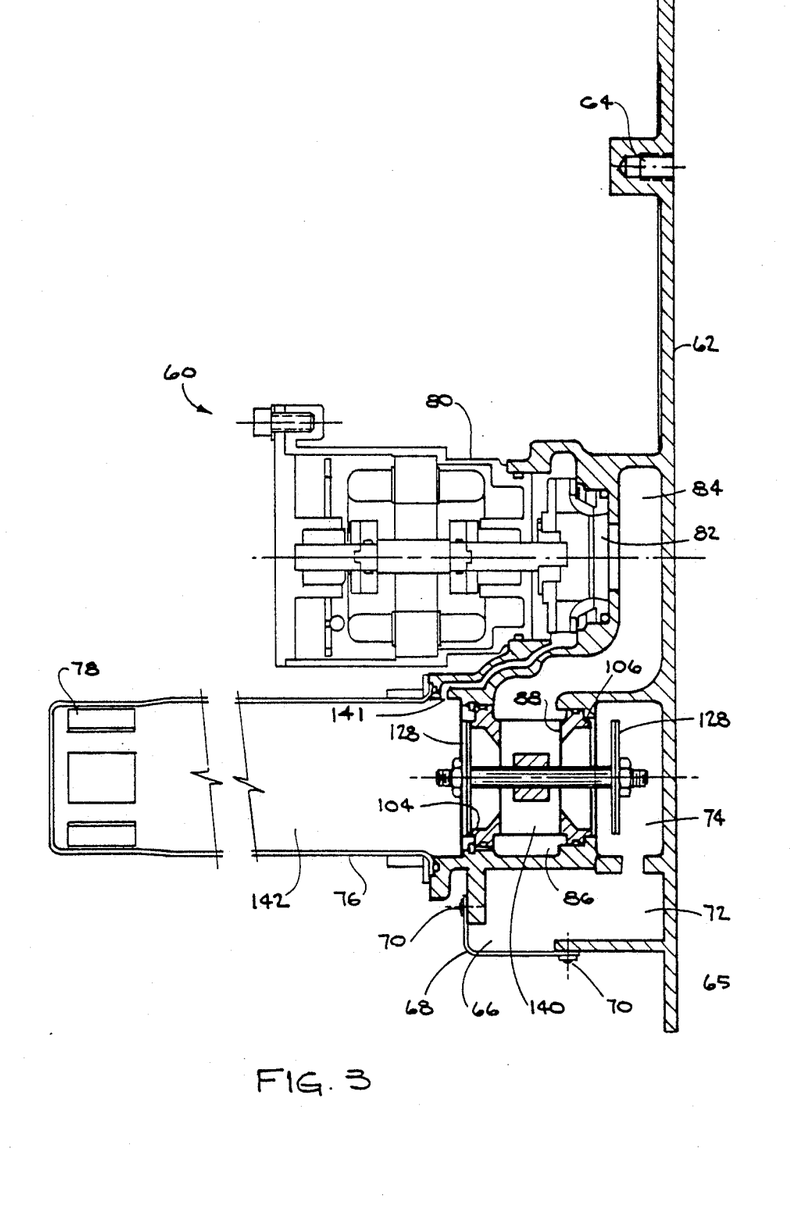
FIG. 3 is a partially sectioned side view of a second embodiment of the present invention in a first gravity condition.

A second embodiment of the present invention is shown in FIG. 3. The second embodiment includes a standpipe and pump assembly generally indicated 60. Assembly 60 includes a base plate casting 62. Casting 62 incorporates fastener accepting means 44 for accepting fasteners which may be used for holding a bottom face 65 of the assembly to a lower wall of a fuel tank (not shown).

Casting 62 incorporates a first opening 66 which is covered by a screen 68. Screen 68 is held in place by fastening means 70. Opening 66 is upwardly disposed slightly from face 65 to a void drawing heavy sediments that may be inside the tank onto the filter screen. Opening 66 is connected with a side chamber 72 in casting 62. Side chamber 72 is in fluid connecting with a first compartment 74 in the casting.

An extension pipe 76 is mounted at the top of casting 62 and is fixed thereto by fastening means. Extension pipe 76 extends to adjacent the top of the tank in which the assembly is mounted. A plurality of second inlet openings 78 are positioned near the uppermost portion of extension pipe 76. A vertical centrifugal pump 80 is mounted on casting 62 by mounting means (not shown). Pump 80 has an inlet 82 which is in fluid connecting with an inlet passage 84 in casting 62.

Figure 4:
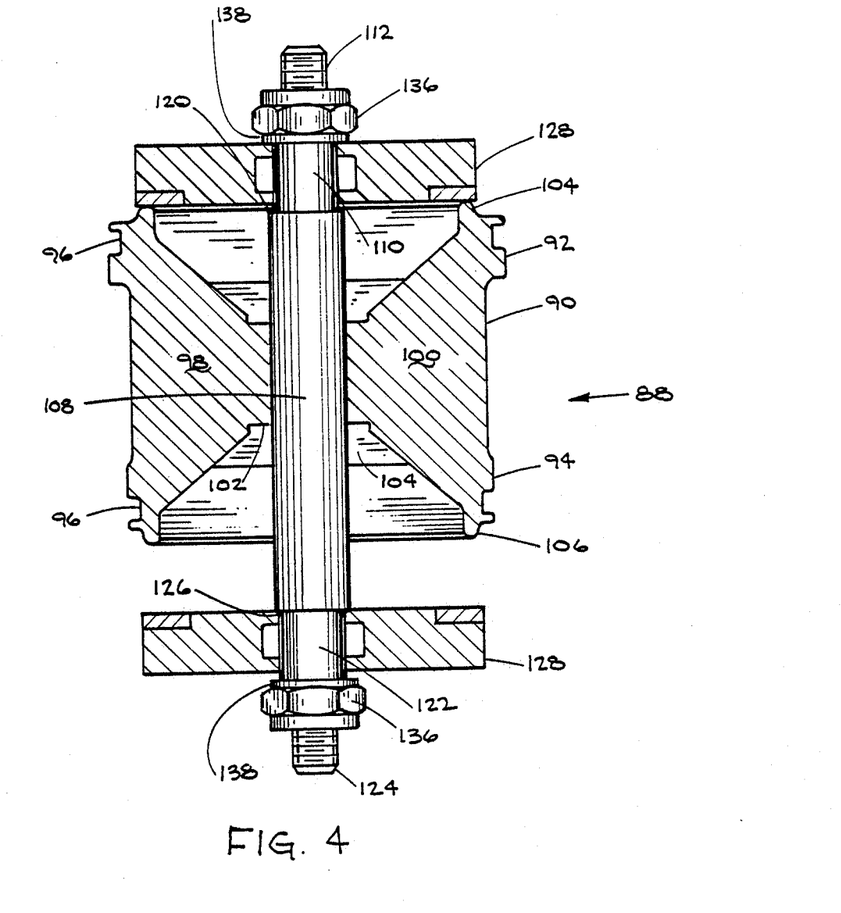
FIG. 4 is a partially sectioned side view of the valve assembly of the second embodiment.
Figure 5:
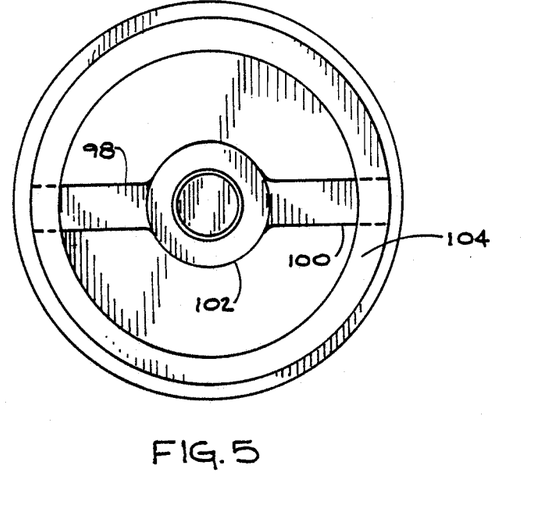
FIG. 5 is a top view of the valve body of the second embodiment.

Casting 62 also incorporates a cylindrical sleeve 86. A valve assembly 88 is positioned in sleeve 86. As shown in FIG. 4, valve assembly 88 includes a valve body 90. Body 90 has an upper cylindrical ring 92 and a lower cylindrical ring 94 which are in close tolerance with sleeve 86. Rings 92 and 94 have outer faces incorporating o-ring slots 96 for accepting o-rings (not separately shown) which seal rings 92 and 94 in sleeve 86 in the assembled condition. Valve body 90 also incorporates a pair of tapered supports 98, 100 which support a central collar 102. Body 90 has a circumferential opening 104 between rings 92 and 94 which enables lateral fluid flow through said body between said rings (See FIG. 5). Body 90 also incorporates a circular upper lip 104 and a circular lower lip 106.

Collar 102 is sized to accept a stem 108 and to enable vertical movement of the stem in the collar. Stem 108 incorporates an upper smooth shoulder 110 which terminates in an upper threaded stud 112. Shoulder 110 is of slightly less diameter that the main body of stem 108 and meets the main body at a step 120. Stem 108 similarly incorporates a shoulder 122, a stud 124 and a step 126 at its lower end.

Figure 6:
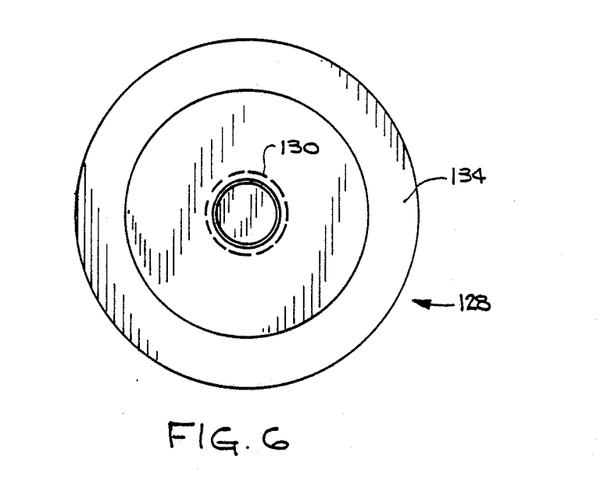
FIG. 6 is a top view of a valve disc of the second embodiment.
Figure 7:
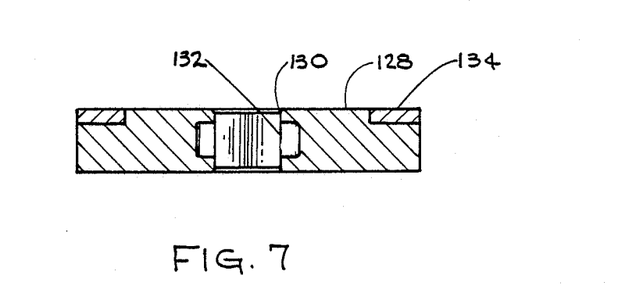
FIG. 7 is a side sectional view of a valve disc of the second embodiment.

Valve discs 128 are fixably mounted at the ends of stem 108 when valve assembly 88 is assembled. As shown in FIGS. 6 and 7, valves discs 128 are cylindrical in shape and incorporate a centered hole 130 sized for accepting shoulders 110 and 120. Hole 130 incorporates a slot 132 which accepts an o-ring (not separately shown) for sealing the discs to the shoulder. Discs 128 incorporate rubber gaskets 134 about their peripheries to aid in sealing the discs against lips 104 and 106. Preferably, gaskets 134 are made from vulcanized fluorosilicone material.

Discs 128 seat on stem 108 against steps 120 and 126. The discs are held in place by nuts 136 which are threaded on studs 112 and 124. A pair of resilient washers 138 between nuts 136 and discs 128 serve to further seal shoulders 110 and 122 to prevent fluid leakage through holes 130. In the preferred form of the second embodiment, valve body 90, stem 108 and discs 128 are made from aluminum.

In operation, discs 128 and stem 108 function similarly to the spool 52 of the first embodiment. Valve body 90 defines a second compartment 140 between upper and lower rings 92 and 94 and a third compartment 142 above upper disc 128. Compartment 140 is open to inlet passage 84 of the casting which supplies fluid to pump 80. Thus, when lower disc 128 is disposed downward from lower lip 106, fluid is drawn from first compartment 74 which is open to first inlet 66. For this first condition, upper disc 128 is seated on upper lip 104 preventing fluid flow between second compartment 140 and third compartment 142. Thus, in the first condition, fluid is drawn from the lower portion of the tank where it is most likely to be located in a first gravity condition.

Casting 62 also incorporates a bleed passage 141 for passing fluid from the pump discharge into the third compartment 142 inside extension pipe 76. In the first gravity condition fluid fills third compartment 142 until it overflows from second inlet openings 78.

When the assembly encounters a negative gravity condition, discs 128 are caused to change position such that lower disc 128 seats against lower lip 106 and upper disc 128 disposes away from upper lip 104. This opens second compartment 140 to third compartment 142 as the gravity condition changes. Fluid continues to flow into the pump without interruption and with a minimum amount of entrained air from third compartment 142. The apparatus returns to the operative condition shown in FIG. 3 upon reinstatement of the first gravity condition without interruption of the fluid flow to the pump.

Figure 8:
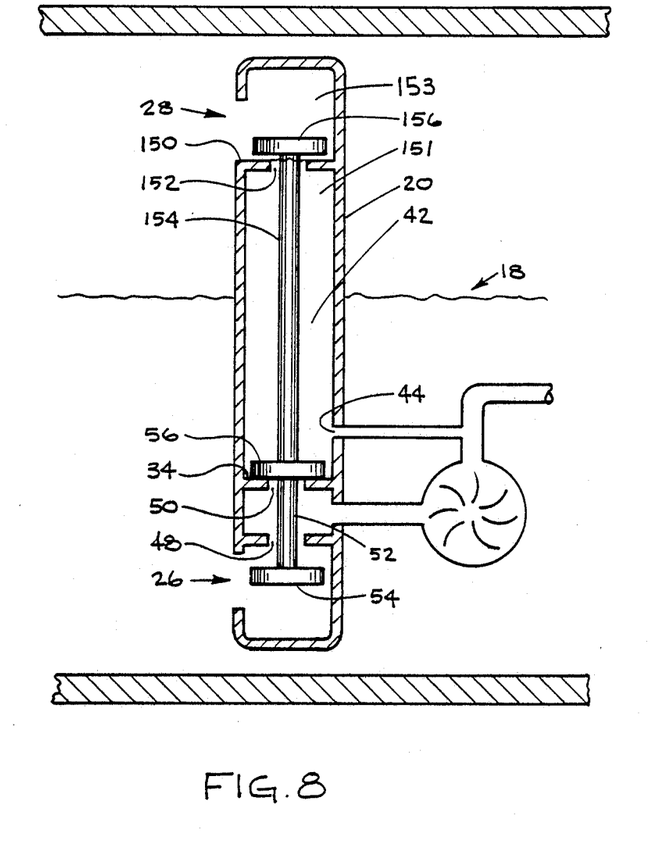
FIG. 8 is a sectional view of a simplified third alternative embodiment of the present invention in a first gravity condition.

A third simplified alternative embodiment to the present invention is shown in FIG. 8. The third embodiment is identical in all respects to the first embodiment except that the third embodiment includes a third traverse dividing wall 150 in standpipe 20. Dividing wall 150 is adjacent second inlet opening 28 and divides the third compartment into a lower portion 151 and an upper portion 153. Dividing wall 150 incorporates a hole 152 which is coaxial with holes 50 and 48. A stem extension 154 extends upward from disc 56 through hole 152 and terminates in a third disc 156. For the condition shown in FIG. 8 where fluid is drawn through first inlet 26, third disc 156 is slightly disposed from third wall 150. This enables the fluid supplied through bleed port 44 to lower portion 151, to flow through hole 152 and out second inlet opening 28.

Figure 9:
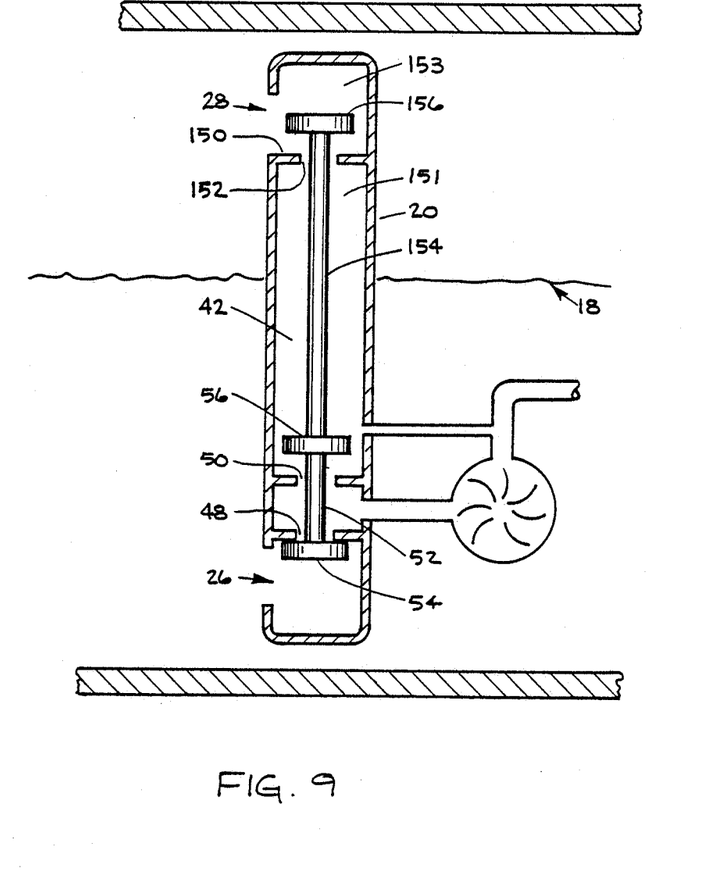
FIG. 9 is a sectional view of the third embodiment of the present invention in a reversed gravity condition.

In the negative, reversed gravity condition, third disc 156 is further disposed away from third wall 150 as disc 56 opens hole 50 and fluid is drawn from the tank through second inlet 28. Third disc 156 serves to provide additional mass to move spool 52 from the condition shown in FIG. 8 to the condition shown in FIG. 9 as the gravity condition reverses. Disc 156 and wall 150 also serve to hold fluid in lower portion 151 above disc 56 as the aircraft is in transition from the first gravitational condition to the negative gravitational condition. With disc 156 at its point of furthest approach toward wall 150 as shown in FIG. 8, fluid can flow from the area defined by second wall 34 and third wall 150 at a slow but sufficient rate to allow the fluid entering through bleed port 44 to escape. Thus, fluid is prevented from splashing out of the standpipe during transition, minimizing the amount of air which may enter the pump as gravity reverses.

Thus, the new apparatus for supplying fuel under negative gravity conditions achieves the above-stated objectives, eliminates difficulties encountered in the use of prior devices, solves problems and obtains the desirable results described herein.

In the foregoing description certain items have been used for brevity, clarity and understanding. However, no unnecessary limitations are to be implied therefrom because such terms are for descriptive purposes and intended to be broadly construed. Moreover, the descriptions and illustrations are by way of examples, and the invention is not limited to the detail shown or described.

Having described the features, discoveries and principles of the invention the manner in which it is constructed and operated and the advantages and useful results obtained the new and useful structures, devices, elements, arrangements, parts, calculations, systems, equipment, operations, and relationships are set forth in the appended claims.

I claim:

1. Apparatus for supplying fluid from a tank to a pump without interruption when the condition of the tank is changed from a first gravity condition to a second gravity condition reversed of said first gravity condition said pump having a low pressure inlet and a high pressure outlet, comprising:

a hollow body, said hollow body having at least two fluid admission inlet openings, a first inlet opening in communication with said fluid at a lower level in said tank and a second inlet opening in communication with said fluid at a higher level relative to said first opening when said tank is in the first gravity condition;

dividing means for dividing said hollow body into three compartments, a first compartment in fluid communication with said first opening, a second compartment in fluid communication with said pump inlet and a third compartment in fluid communication with said second opening and the outlet of the pump;

first fluid passage means for passing fluid through said dividing means between said first and second compartments;

second fluid passage means for passing fluid through said dividing means between said second and third compartments;

first valve means for enabling or prohibiting fluid flow through said first passage, said first valve means having a first condition enabling fluid flow through said first fluid passage means and a second condition prohibiting fluid flow through said first fluid passage means;

second valve means for enabling or prohibiting fluid flow through said second passage means, said second valve means having a first condition prohibiting fluid flow through said second fluid passage means, and a second condition enabling fluid flow through said second fluid passage means;

control means for controlling the conditions of said first and second valve means, said control means changing the condition of said valve means from the first conditions to the second conditions responsive to change of said tank from said first gravity condition to said second gravity condition.

2. The apparatus according to claim 1 and further comprising a pump inlet port in said second compartment wherein said second fluid passage means terminates in said second compartment adjacent said inlet port.

3. The apparatus according to claim 2 wherein the hollow body extending between the inlet openings is a standpipe located within said tank; said dividing means are a first dividing wall and a second dividing wall traverse of said standpipe, said first compartment defined by a lower internal portion of said standpipe and said first dividing wall, said second compartment defined by a middle internal portion of said standpipe and said first and second dividing walls, and said third compartment defined by an upper internal portion of said standpipe and said second dividing wall; said first fluid passage means is a first hole in said first dividing wall; and, said second fluid passage means is a second hole in said second dividing wall.

4. The apparatus according to claim 3 wherein said first and second holes are vertically disposed, and wherein said first valve means is a lower disc sized for blocking said first hole and positioned in said first compartment adjacent said first hole, and said second valve means is an upper disc in said third compartment sized for blocking said second hole, and further comprising:

a movable stem connecting said upper and lower discs, said stem sized such that in a first position, said lower disc is disposed from said first hole when said upper disc is in blocking relation with said second hole, and in a second position said upper disc is disposed from said second hole and said lower disc is in blocking relation in said first hole; and wherein said control means are inertial and gravitational forces acting on the masses of said discs and moving them from the first position to the second position as the apparatus is moved from the first gravity condition to the second gravity condition.

5. The apparatus according to claim 4 wherein said first and second holes are coaxial with said stem and further comprising guide means for restricting movement of said stem to said axial direction.

6. The apparatus according to claim 5 and further comprising gasket means for sealing said lower disc and said first hole and said upper disc and said second hole when said respective discs and holes are adjacent.

7. The apparatus according to claim 6 wherein said gasket means are circular resilient gaskets on a face of the lower disc adjacent said first hole and on a face of said upper disc adjacent said second hole.

8. The apparatus according to claim 7 and further comprising screens for covering said first and second inlet openings.

9. The apparatus according to claim 1 wherein said third compartment is in fluid connection with said pump outlet through a bleed passage and further comprising check valve means in said passage for enabling passage of fluid only from said outlet into said third compartment.

10. The apparatus according to claim 9 and further comprising a pump inlet port in said second compartment and wherein said second fluid passage means terminates in said second compartment adjacent said inlet port.

11. The apparatus according to claim 10 wherein:

the hollow body extending between the inlet openings is a standpipe;

the dividing means are a first dividing wall and a second dividing wall traverse of said standpipe said first compartment defined by a lower internal portion of said standpipe and said first dividing wall, said second compartment defined by a middle internal portion of said standpipe and said first and second dividing walls, and said third compartment is defined by an upper portion of said standpipe and said second dividing wall;

said first fluid passage means is a first hole in said first dividing wall; and said second fluid passage means is a second hole in said second dividing wall.

12. The apparatus according to claim 11 wherein said first and second holes are vertically disposed and wherein said first valve means is a lower disc sized for blocking said first hole and positioned in said first compartment adjacent said first hole, and said second valve means is an upper disc in said third compartment sized for blocking said second hole and further comprising:

a movable stem connecting said upper and lower discs, said stem sized such that in a first position said lower disc is disposed from said first hole when said upper disc is in blocking relation with said second hole, and in a second position said upper disc is disposed from said second hole when said lower disc is in blocking relation with said first hole; and wherein said control means are inertial and gravitational forces acting on the masses of said discs and moving said discs from the first position to the second position as the apparatus is moved from the first gravity condition to the second gravity condition.

13. The apparatus according to claim 12 wherein said first and second holes are coaxial with said stem and further comprising guide means for restricting movement of said stem to said axial direction.

14. The apparatus according to claim 13 and further comprising gasket means for sealing said lower disc and said first hole and said upper disc and said second hole when said respective discs and holes are in blocking relation.

15. The apparatus according to claim 14 wherein said gasket means are circular resilient gaskets on a face of the lower disc adjacent said first hole and on a face of said upper disc adjacent said second hole.

16. The apparatus according to claim 15 and further comprising screens covering said first and second inlet openings.

17. The apparatus according to claim 4 wherein said third compartment is in fluid connection with said pump outlet through a bleed passage and further comprising:
a third dividing wall transversely disposed in said standpipe and adjacent said second inlet opening, said third wall incorporating a third hole vertically disposed of said first and second holes;
a third disc above said third wall and sized for restricting the flow of fluid through said third opening when said third disc is at a point of closest relation to said third opening, said disc enabling passage of at least an amount of fluid entering said third compartment through said bleed passage at the point of closest relation; and
an extension connecting said upper disc and said third disc said extension sized such that said third disc is at the point of closest relation for said first position of said stem and is further disposed from said third hole when said stem is in the second position.

18. The apparatus according to claim 17 wherein said first, second and third holes are coaxial and further comprising guide means for restricting movement of said stem to said axial direction.

19. The apparatus according to claim 18 and further comprising check valve means in said bleed passage for enabling passage of fluid only from said pump outlet to said third compartment.

20. The apparatus according to claim 19 and further comprising gasket means for sealing said lower disc and said first hole and said upper disc and said second hole when said respective discs and holes are in blocking relation.

21. The apparatus according to claim 20 wherein said gasket means are circular resilient gaskets on a face of the lower disc adjacent said first hole and on a face of said upper disc adjacent said second hole.

22. The apparatus according to claim 21 and further comprising screens covering said first and second inlet openings.

23. Apparatus for supplying fluid from a tank to a pump without interruption when the condition of the tank is changed from a first gravity condition to a second gravity condition reversed of said first gravity condition, said pump having a low pressure inlet and a high pressure outlet, comprising:
a hollow body, said body having at least two fluid admission inlet openings, a first inlet opening in communication with said fluid at a lower level in said tank, and a second inlet opening in communication with said fluid at a higher level relative to said first opening when said tank is in the first gravity condition;
first dividing means dividing said hollow body into three compartments, a first compartment in fluid communication with said first opening, a second compartment in fluid communication with said pump inlet and a third compartment in fluid communication with said second opening and the outlet of the pump;
first fluid passage means for passing fluid through said dividing means between said first and second compartments;
second fluid passage means for passing fluid through said dividing means between said second and third compartments;
second dividing means in said third compartment for separating said third compartment into lower and upper portions said upper portion in fluid communication with said second inlet, the pump outlet in fluid communication with said lower portion of said third compartment;
third fluid passage means for passing fluid between said upper and lower portions of said third compartment;
first valve means for enabling or prohibiting fluid flow through said first passage means, said first valve means having a first condition enabling flow through said first fluid passage means and a second condition prohibiting flow through said first fluid passage means;
second valve means for enabling or prohibiting fluid flow through said second fluid passage means, said second valve means having a first condition prohibiting flow through said second fluid passage means and a second condition enabling flow through said second fluid passage means;
third valve means for enabling or restricting fluid flow through said third fluid passage means, said third valve means having a first condition partially prohibiting flow through said third passage means and a second condition enabling flow through said third passage means;
control means for controlling the conditions of said first, second and third valve means, said control means changing the conditions of said valve means from the first conditions to the second conditions responsive to a change of said tank from said first gravity condition to said second gravity condition.

24. Apparatus according to claim 23 and further comprising:
a pump inlet port in said second compartment wherein said second fluid passage means terminates in said second compartment adjacent said inlet port.

25. The apparatus according to claim 24 wherein:
the hollow body extending between the inlet openings is a standpipe;
said first dividing means are a first dividing wall and a second dividing wall traverse of said standpipe, said first compartment defined by a lower internal portion of said standpipe and said first dividing wall, said second compartment defined by a middle portion of said standpipe and said first and second dividing walls, and said third compartment defined by an upper internal portion of said standpipe and said second dividing wall;
said first fluid passage means is a first hole in said first dividing wall; and
said second fluid passage means is a second hole in said second dividing wall.

26. The apparatus according to claim 25 wherein said second dividing means is a third dividing wall traverse of said standpipe adjacent said second inlet opening, and said third fluid passage means is a third hole in said third dividing wall.

27. The apparatus according to claim 26 wherein:
said first, second and third holes are vertically disposed;

said first valve means is a lower disc in said first compartment adjacent said first dividing wall and sized for blocking said first hole;

said second valve means is an upper disc in said third compartment adjacent said second dividing wall and sized for blocking said second hole; and said third valve means is a third disc in the upper portion of said third compartment sized for partially blocking said third hole at a point of closest approach thereto; and further comprising:

a movable stem connecting said upper, lower and third discs sized such that in a first position said lower disc is disposed from said first hole, said upper disc is in blocking relation with said second hole and said third disc is at the point of closest approach to said third hole, and in a second position said upper disc is disposed from said second hole, said lower disc is in blocking relation with said first hole and said third disc disposed further away from said third hole; and wherein said control means are inertial and gravitational forces acting said discs and moving said stem from the first position to said second position as the apparatus moves from the first gravity condition to the second gravity condition.

28. The apparatus according to claim 27, wherein said first, second and third holes are coaxial and further comprising guide means for restricting movement of said stem to said axial direction.

29. The apparatus according to claim 28 and further comprising gasket means for sealing said lower disc and said first hole and said upper disc and said second hole when said respective discs and holes are in blocking relation.

30. The apparatus according to claim 29 wherein said gasket means are circular resilient gaskets on a face of the lower disc adjacent said first hole and on a face of said upper disc adjacent said second hole.

31. The apparatus according to claim 30 and further comprising screens covering said first and second openings.

32. The apparatus according to claim 31 wherein the lower portion of said third compartment communicates with said pump outlet by a bleed line and further comprising check valve means in said bleed line for enabling fluid flow only from said outlet to said third compartment.

* * * * *